United States Patent
Hutter et al.

(10) Patent No.: US 11,620,109 B2
(45) Date of Patent: *Apr. 4, 2023

(54) CONVERTING A BOOLEAN MASKED VALUE TO AN ARITHMETICALLY MASKED VALUE FOR CRYPTOGRAPHIC OPERATIONS

(71) Applicant: Cryptography Research, Inc., San Jose, CA (US)

(72) Inventors: Michael Hutter, Walnut Creek, CA (US); Michael Tunstall, Walnut Creek, CA (US)

(73) Assignee: Cryptography Research, Inc., San Jose, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/124,374

(22) Filed: Dec. 16, 2020

(65) Prior Publication Data
US 2021/0173618 A1 Jun. 10, 2021

Related U.S. Application Data

(63) Continuation of application No. 16/080,147, filed as application No. PCT/US2017/020670 on Mar. 3, 2017, now Pat. No. 10,871,947.

(Continued)

(51) Int. Cl.
*G06F 21/72* (2013.01)
*H04L 9/06* (2006.01)
(Continued)

(52) U.S. Cl.
CPC ............... *G06F 7/764* (2013.01); *G06F 7/00* (2013.01); *G06F 7/58* (2013.01); *G06F 7/588* (2013.01);
(Continued)

(58) Field of Classification Search
CPC .. G06F 7/764; G06F 2207/7233; G06F 7/588; G06F 21/72; G06F 2221/2107;
(Continued)

(56) References Cited

U.S. PATENT DOCUMENTS 7,334,133 B2 2/2008 Goubin
10,871,947 B2 * 12/2020 Hutter .................... H04L 9/002
(Continued)

FOREIGN PATENT DOCUMENTS

| CN | 101044535 A | 9/2007 |
| CN | 104852795 A | 8/2015 |
| CN | 104967509 A | 10/2015 |

OTHER PUBLICATIONS

CN Office Action dated Dec. 21, 2020 re: CN Appln. No. 201780009651.9. 10 pages. (W/Translation).
(Continued)

*Primary Examiner* — Matthew T Henning
(74) *Attorney, Agent, or Firm* — Lowenstein Sandler LLP

(57) ABSTRACT

A first input share value, a second input share value, and a third input share value may be received. The first input share value may be converted to a summation or subtraction between an input value and a combination of the second input share value and the third input share value. A random number value may be generated and combined with the second input share value and the third input share value to generate a combined value. Furthermore, a first output share value may be generated based on a combination of the converted first input share value, the combined value, and additional random number values.

20 Claims, 10 Drawing Sheets

Related U.S. Application Data

(60) Provisional application No. 62/438,254, filed on Dec. 22, 2016, provisional application No. 62/385,773, filed on Sep. 9, 2016, provisional application No. 62/303,270, filed on Mar. 3, 2016.

(51) Int. Cl.

| | | |
|---|---|---|
| *H04L 9/14* | (2006.01) | |
| *H04L 9/30* | (2006.01) | |
| *G06F 7/58* | (2006.01) | |
| *H04L 9/00* | (2022.01) | |
| *G09C 1/00* | (2006.01) | |
| *G06F 7/76* | (2006.01) | |
| *G06F 7/00* | (2006.01) | |

(52) U.S. Cl.
CPC .............. *G06F 21/72* (2013.01); *G09C 1/00* (2013.01); *H04L 9/002* (2013.01); *H04L 9/06* (2013.01); *H04L 9/14* (2013.01); *H04L 9/30* (2013.01); *G06F 2207/7233* (2013.01); *G06F 2221/2107* (2013.01); *H04L 2209/04* (2013.01); *H04L 2209/046* (2013.01)

(58) Field of Classification Search
CPC .. G09C 1/00; H04L 9/002; H04L 9/06; H04L 9/14; H04L 9/30; H04L 2209/04
See application file for complete search history.

(56) References Cited

U.S. PATENT DOCUMENTS

| | | |
|---|---|---|
| 2001/0002486 A1 | 5/2001 | Kocher et al. |
| 2004/0139136 A1 | 7/2004 | Goubin |
| 2005/0147243 A1 | 7/2005 | Baek |
| 2009/0158054 A1 | 6/2009 | Dijk et al. |
| 2010/0235417 A1 | 9/2010 | Baek |
| 2011/0013767 A1 | 1/2011 | Kim et al. |
| 2015/0169904 A1 | 6/2015 | Leiserson et al. |
| 2015/0180652 A1 | 6/2015 | Kocher et al. |

OTHER PUBLICATIONS

Coron, Jean-Sebastien et al., "Secure Conversion Between Boolean and Arithmetic Masking of Any Order", Cryptographic Hardware and Embedded Systems—CHES 2014, Sep. 23-26, 2014. 18 pages.
EP Extended European Search Report dated Sep. 17, 2019 re: EP Appln. No. 17760902.1. 7 Pages.
Goubin, Louis, "A Sound Method for Switching Between Boolean and Arithmetic Masking", Cryptographic Hardware and Embedded Systems—CHES 2001, May 14-16, 2001. 15 pages.
Hutter, Michael et al., "Constant-Time Higher-Order Boolean-to-Arithmetic Masking", International Association for Cryptologic Research, vol. 20161101:015914, Oct. 27, 2016, pp. 1-21, XP061022009, Retrieved on Oct. 27, 2016. 21 Pages.
Notification Concerning Transmittal of International Preliminary Report on Patentability dated Sep. 13, 2018 re: Int'l Appln. No. PCT/US2017/020670. 18 Pages.
Notification of Transmittal of the International Search Report and the Written Opinion of the International Searching Authority dated May 22, 2017 re: Int'l Appln. No. PCT/US2017/020670. 25 Pages.
Vadnala, Praveen Kumar et al., "Algorithms for Switching Between Boolean and Arithmetic Masking of Second Order", Oct. 19, 2013, International Conference on Computer Analysis of Images and Patterns, CAIP 2017: Computer Analysis of Images and Patterns; [Lecture Notes in Computer Science; Lect.Notes Computer}, SPringer, Berlin, Heidelberg, pp. 95-110, XP047041146 ISBN: 978-3-642-17318-9 16 Pages.
CN Office Action dated Sep. 3, 2021 re: CN Appln. No. 201780009651.9. 6 pages (w/Translation).
IN First Examination Report dated Apr. 28, 2021 re: IN Appln. No. 201817023120. 7 pages. (with translation).
EP Communication Pursuant to Article 94(3) EPC dated Jun. 28, 2021 re: EP Appln. No. 17760902.1. 8 pages.

* cited by examiner

Algorithm 2: Second-order Secure Boolean-to-Arithmetic Masking.

Input: $x' = x \oplus r_1 \oplus r_2$ with $x, r_1, r_2 \in \mathbb{Z}_{2^k}$ and random numbers $\gamma_1, \gamma_2, \alpha, s_1, s_2 \in \mathbb{Z}_{2^k}$ for some $k \in \mathbb{Z}_{\geq 0}$

Output: $x'' = x + s_1 + s_2$

1  $z \leftarrow \gamma_1 \oplus r_1$
2  $z \leftarrow z \oplus \gamma_2$
3  $z \leftarrow z \oplus r_2$
4  $u \leftarrow x' \oplus z$
5  $z \leftarrow z \oplus \alpha$
6  $u \leftarrow u + z$
7  $v \leftarrow x' \oplus \gamma_1$
8  $v \leftarrow v \oplus \alpha$
9  $v \leftarrow v + \gamma_1$
10 $w \leftarrow x' \oplus \gamma_2$
11 $w \leftarrow w \oplus \alpha$
12 $w \leftarrow w + \gamma_2$
13 $z \leftarrow r_2 \oplus s_1$
14 $u \leftarrow u \oplus r_2$
15 $u \leftarrow u \oplus v$
16 $u \leftarrow u \oplus w$
17 $v \leftarrow u \oplus s_1$
18 $v \leftarrow v + r_2$
19 $w \leftarrow u \oplus z$
20 $v \leftarrow v \oplus w$
21 $w \leftarrow u + z$
22 $z \leftarrow v \oplus w$
23 $w \leftarrow \alpha \oplus r_2$
24 $u \leftarrow s_2 \oplus r_1$
25 $u \leftarrow u - w$
26 $w \leftarrow w \oplus s_2$
27 $v \leftarrow w \oplus r_1$
28 $w \leftarrow w - r_1$
29 $u \leftarrow u \oplus v$
30 $u \leftarrow u \oplus w$
31 $z \leftarrow z + u$ return $z$

FIG. 3B

Algorithm 3: Second-order Secure Boolean-to-Arithmetic Masking

Input: $x' = x \oplus r_1 \oplus r_2$ with $x, r_1, r_2 \in \mathbb{Z}_{2^k}$ and random numbers $\in \mathbb{Z}_{2^k}$ for some $k \in \mathbb{Z}_{\geq 0}$

Output: $x'' = x + s_1 + s_2$

1. $z \leftarrow \gamma_1 \oplus r_1$
2. $z \leftarrow z \oplus \gamma_2$
3. $z \leftarrow z \oplus r_2$
4. $u \leftarrow x' \oplus z$
5. $z \leftarrow z \oplus a$
6. $u \leftarrow u + z$
7. $v \leftarrow x' \oplus \gamma_1$
8. $v \leftarrow v \oplus a$
9. $v \leftarrow v + \gamma_1$
10. $w \leftarrow x' \oplus \gamma_2$
11. $w \leftarrow w \oplus a$
12. $w \leftarrow w + \gamma_2$
13. $z \leftarrow r_2 \oplus s_1$
14. $u \leftarrow u \oplus r_2$
15. $u \leftarrow u \oplus v$
16. $u \leftarrow u \oplus w$
17. $v \leftarrow u \oplus s_1$
18. $v \leftarrow v + r_2$
19. $w \leftarrow u \oplus z$
20. $v \leftarrow v \oplus w$
21. $w \leftarrow u + z$
22. $z \leftarrow v \oplus w$
23. $z \leftarrow z + s_2$
24. $u \leftarrow z \oplus r_2$
25. $u \leftarrow u \oplus a$
26. $u \leftarrow u - r_1$
27. $z \leftarrow z \oplus r_1$
28. $w \leftarrow r_2 \oplus a$
29. $v \leftarrow z - w$
30. $z \leftarrow z \oplus w$
31. $z \leftarrow z \oplus u$
32. $z \leftarrow z \oplus v$ return $z$

FIG. 3C

Algorithm 3: Third-order Secure Boolean-to-Arithmetic Masking.

Input: $x' = x \oplus r_1 \oplus r_2 \oplus r_3$ with $x, r_1, r_2, r_3 \in \mathbb{Z}_{2^k}$ and random numbers $\gamma_1, \gamma_2, \gamma_3, \alpha, \delta_1, \delta_2, \kappa_1, \kappa_2, s_1, s_2, s_3 \in \mathbb{Z}_{2^k}$ for some $k \in \mathbb{Z}_{\geq 0}$

Output: $x'' = x + s_1 + s_2 + s_3$

1. $t \leftarrow \gamma_1$
2. $t \leftarrow t \oplus \gamma_2$
3. $t \leftarrow t \oplus r_2$
4. $t \leftarrow t \oplus \gamma_3$
5. $t \leftarrow t \oplus r_3$
6. $u \leftarrow t \oplus \alpha$
7. $t \leftarrow x' \oplus t$
8. $t \leftarrow t + u$
9. $u \leftarrow x' \oplus \gamma_1$
10. $u \leftarrow u \oplus \alpha$
11. $u \leftarrow u + \gamma_1$
12. $v \leftarrow x' \oplus \gamma_2$
13. $v \leftarrow v \oplus \alpha$
14. $v \leftarrow v + \gamma_2$
15. $w \leftarrow x' \oplus \gamma_3$
16. $w \leftarrow w \oplus \alpha$
17. $w \leftarrow w + \gamma_3$
18. $z \leftarrow \alpha \oplus u$
19. $z \leftarrow z \oplus s_1$
20. $z \leftarrow z \oplus v$
21. $z \leftarrow z \oplus w$
22. $z \leftarrow z \oplus t$
23. $z \leftarrow z \oplus x'$
24. $t \leftarrow z \oplus r_2$
25. $t \leftarrow t + r_2$
26. $t \leftarrow t \oplus z$
27. $u \leftarrow r_2 \oplus s_1$
28. $z \leftarrow z \oplus u$
29. $z \leftarrow z + u$
30. $z \leftarrow z \oplus t$
31. $t \leftarrow \kappa_1 \oplus r_1$
32. $t \leftarrow t \oplus \kappa_2$
33. $t \leftarrow t \oplus \alpha$
34. $t \leftarrow t \oplus r_2$
35. $t \leftarrow t \oplus r_3$
36. $u \leftarrow t \oplus \delta_1$
37. $u \leftarrow u - \delta_1$
38. $v \leftarrow t \oplus \delta_2$
39. $v \leftarrow v - \delta_2$
40. $w \leftarrow \kappa_1 \oplus \delta_1$
41. $w \leftarrow w \oplus \delta_2$
42. $w \leftarrow w \oplus \kappa_2$
43. $t \leftarrow t \oplus w$
44. $w \leftarrow w - t$
45. $t \leftarrow u \oplus v$
46. $t \leftarrow t \oplus w$
47. $z \leftarrow z + s_2$
48. $z \leftarrow z + t$
49. $v \leftarrow s_3 \oplus \kappa_2$
50. $w \leftarrow v \oplus \kappa_1$
51. $u \leftarrow v - \kappa_1$
52. $u \leftarrow u \oplus w$
53. $v \leftarrow s_3 \oplus \kappa_1$
54. $v \leftarrow v - \kappa_2$
55. $w \leftarrow u \oplus v$
56. $z \leftarrow z + w$ return $z$

FIG. 3D

200
CONVERTING A BOOLEAN MASKED VALUE TO AN ARITHMETICALLY MASKED VALUE FOR CRYPTOGRAPHIC OPERATIONS

RELATED APPLICATIONS

This application is a continuation of U.S. patent application Ser. No. 16/080,147, filed Aug. 27, 2018, which is National Stage application of International Application, PCT/US17/20670, filed Mar. 3, 2017, which claims the benefit of U.S. Provisional Application No. 62/303,270, filed Mar. 3, 2016, U.S. Provisional Application No. 62/385,773, filed Sep. 9, 2016, and U.S. Provisional Application No. 62/438,254, filed Dec. 22, 2016, the entire contents of all are herein incorporated by reference.

BRIEF DESCRIPTION OF THE DRAWINGS

The present disclosure will be understood more fully from the detailed description given below and from the accompanying drawings of various implementations of the disclosure.

FIG. 3B illustrates a series of operations to perform the conversion of the Boolean masked value to the arithmetically masked value for cryptographic operations in accordance with some embodiments of the present disclosure.

FIG. 3C illustrates another series of operations to perform the conversion of the Boolean masked value to the arithmetically masked value for cryptographic operations in accordance with some embodiments of the present disclosure.

FIG. 3D illustrates another series of operations to perform a third order conversion of the Boolean masked value to the arithmetically masked value in accordance with some embodiments of the present disclosure.

DETAILED DESCRIPTION

Figure 1:
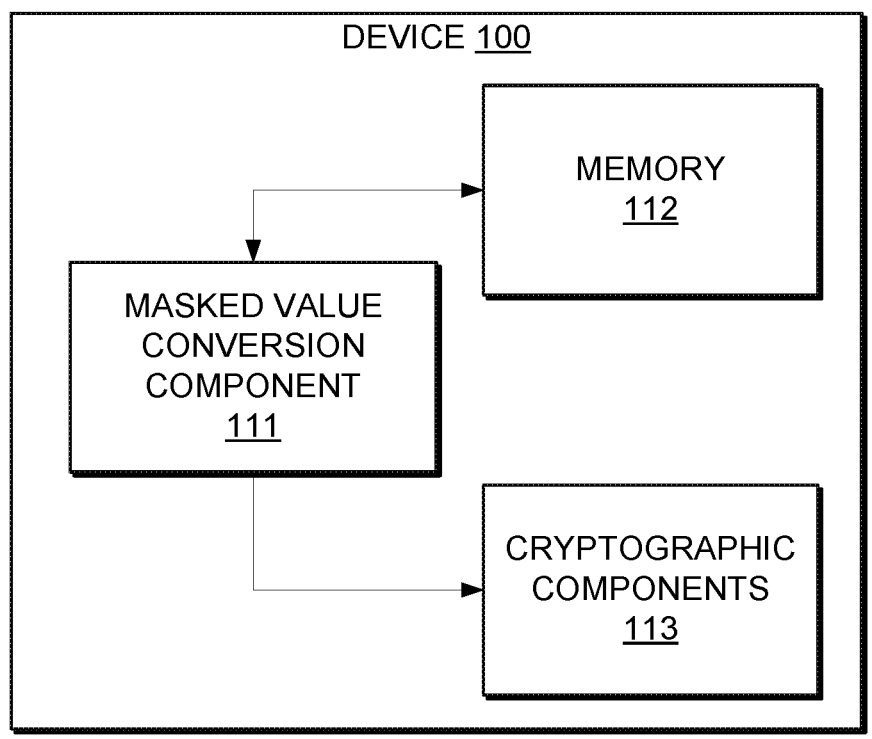
FIG. 1 illustrates an example device using a masked value conversion component for cryptographic operations in accordance with some embodiments.

Aspects of the present disclosure are directed to converting a Boolean masked value to an arithmetically masked value for cryptographic operations. An integrated circuit may perform a cryptographic operation that may result in susceptibility of the integrated circuit to a side-channel attack where an attacker (e.g., an unauthorized entity) may obtain information as the cryptographic operation is performed. An example of a side-channel attack includes, but is not limited to, Differential Power Analysis (DPA) where the attacker who seeks to obtain a secret key used in the cryptographic operation may study the differences in power consumption of the integrated circuit as the cryptographic operation is performed. An attacker may be an unauthorized entity that may obtain the input (e.g., the secret key) to the cryptographic operation by analyzing power consumption measurements of the integrated circuit over a period of time. Accordingly, when the sender transmits a ciphertext to a receiver by encrypting plaintext via a cryptographic operation, the attacker may be able to retrieve the secret key that is used to encrypt the plaintext to the ciphertext by observing the power consumption of the integrated circuit as the cryptographic operation is performed to encrypt the plaintext into the ciphertext. For example, the attacker may uncover a cryptographic (e.g., secret or private) key that is used to encrypt the plaintext as the cryptographic operation is performed by the integrated circuit.

Masking may be used to obfuscate or hide the input to the cryptographic operation with random data and then the cryptographic operation may be performed with the masked input. Such masking may render the intermediate states or values of the cryptographic operation indistinguishable from random data when an attacker of the integrated circuit observes power consumption of the integrated circuit when performing the cryptographic operation. For example, the plaintext may be subject to a Boolean operation such as an exclusive-or (XOR) operation with a random value before the cryptographic operation encodes the plaintext into the ciphertext. Alternatively, the plaintext may be subject to an arithmetic operation such as an addition operation with a random value before the cryptographic operation encodes the plaintext into ciphertext. As an example, for an input x, a Boolean masked value corresponding to the input x may be x' that represents (x⊕r) where r is a random number. Furthermore, for the input x, an arithmetically masked value x' may represent (x+r) where r is the random number.

Certain cryptographic operations may use both a Boolean operation and an arithmetic operation during the performance of the cryptographic operation. For example, a cryptographic operation may perform both an XOR operation and an arithmetic (e.g., summation or subtraction) operation with masked values. The cryptographic operation may perform a first operation based on Boolean masked values and may subsequently perform a second operation based on arithmetically masked values. Thus, in order to perform the arithmetic operation, the Boolean masked values may need to be converted to arithmetically masked values. The conversion between the Boolean masked values to arithmetically masked values may need to be secure so that the conversion does not result in some DPA leakage (e.g., the attacker identifying information from observable differences in power consumption of the integrated circuit). The DPA leakage may result in an attacker may being able to obtain the secret key (or secret-key dependent data) used in the cryptographic operation while performing the conversion between the Boolean masked value to the arithmetically masked value.

Accordingly, a process to efficiently and securely convert a Boolean masked value to an arithmetically masked value may be used to perform a cryptographic operation. Such a process may initiate a conversion between the Boolean masked value to the arithmetically masked value when an arithmetic operation is to be performed during the cryptographic operation. The conversion may be performed and may be implemented in an integrated circuit to prevent DPA leaks that allow an attacker to retrieve an input to the cryptographic operation (e.g., the unmasked value). Furthermore, the conversion may be performed with a fewer number of operations. Thus, aspects of the present disclosure provide additional security to an integrated circuit performing a cryptographic operation as well as an increased efficiency in the performance (e.g., less computation time) of the cryptographic operation when a Boolean masked value is to be converted to an arithmetically masked value.

FIG. 1 illustrates an example device including a masked value conversion component. In general, the device 100 may include an integrated circuit that is associated with a masked value conversion component 111, a memory 112, and cryptographic components 113. The masked value conversion component 111 of the integrated circuit may receive a Boolean masked input value and may convert the Boolean masked input value to an arithmetically masked input value for use in a cryptographic operation performed by the cryptographic components 113.

As shown in FIG. 1, the device 100 may include a masked value conversion component 111 that may convert a masked input value of a first type to a second type of masked input value. For example, the masked value component 111 may receive a Boolean masked input value or share from the memory 112 and may perform a series of operations to convert the Boolean masked input value to an arithmetically masked input value. The masked value component 111 may further receive randomly generated numbers from a random number generation component. For example, in some embodiments, the memory 112 may be used to store the randomly numbers that are generated by the random number generation component and the stored random numbers may be retrieved by the masked value conversion component 111. In the same or alternative embodiments, the masked value conversion component 111 may receive the random numbers from the random number generation component without the random numbers being stored at the memory 112. The device components 113 may subsequently use the arithmetically masked input value in a cryptographic operation. Examples of such cryptographic operations include, but are not limited to, generating a digital signature to authenticate the device 100 or a component of the device 100, encrypting or decrypting data, etc. Accordingly, the masked value conversion component 111 may convert a Boolean masked input value to an arithmetically masked input value for use by the cryptographic components 113. Furthermore, the cryptographic components 113 may perform a cryptographic operation based on the arithmetically masked input value. Examples of such cryptographic operations may be based on, but are not limited to, Secure Hash Algorithm (SHA)-1, SHA-2, International Data Encryption Algorithm (IDEA), Rivest Cipher 6 (RC6), Extended Tiny Encryption Algorithm (XTEA), ChaCha20, Salsa20, etc.

In operation, the cryptographic components 113 may perform a cryptographic operation. At a first part of the cryptographic operation, the operations that are performed by the cryptographic components 113 may correspond to Boolean operations. For example, an exclusive-or (XOR) operation may be performed with a Boolean masked input value that is received from the memory 112 or from another component of the device 100. At a second part of the cryptographic operation, the operations that are performed by the cryptographic components 113 may correspond to arithmetic operations. For example, an addition operation with integers may be performed. Thus, the cryptographic operation may switch from being based on, or using, Boolean operations to being based on, or using, arithmetic operations. However, since the first part of the cryptographic operation is based on the Boolean operations produces Boolean-masked values, the Boolean masked input value may first be converted to arithmetically masked values so that the arithmetic operations may then be performed. When the cryptographic components 113 perform the arithmetic operations, then the cryptographic components 113 may provide a request to the masked value conversion component 111 to convert a Boolean masked input value stored at the memory 112. The Boolean masked input value may be converted to an arithmetically masked input value and then used by the cryptographic components 113 to perform arithmetic operations as part of the cryptographic operation that is being performed. Further details with regard to converting a Boolean masked input value to an arithmetically masked input value are described in conjunction with FIG. 3A.

Figure 2:
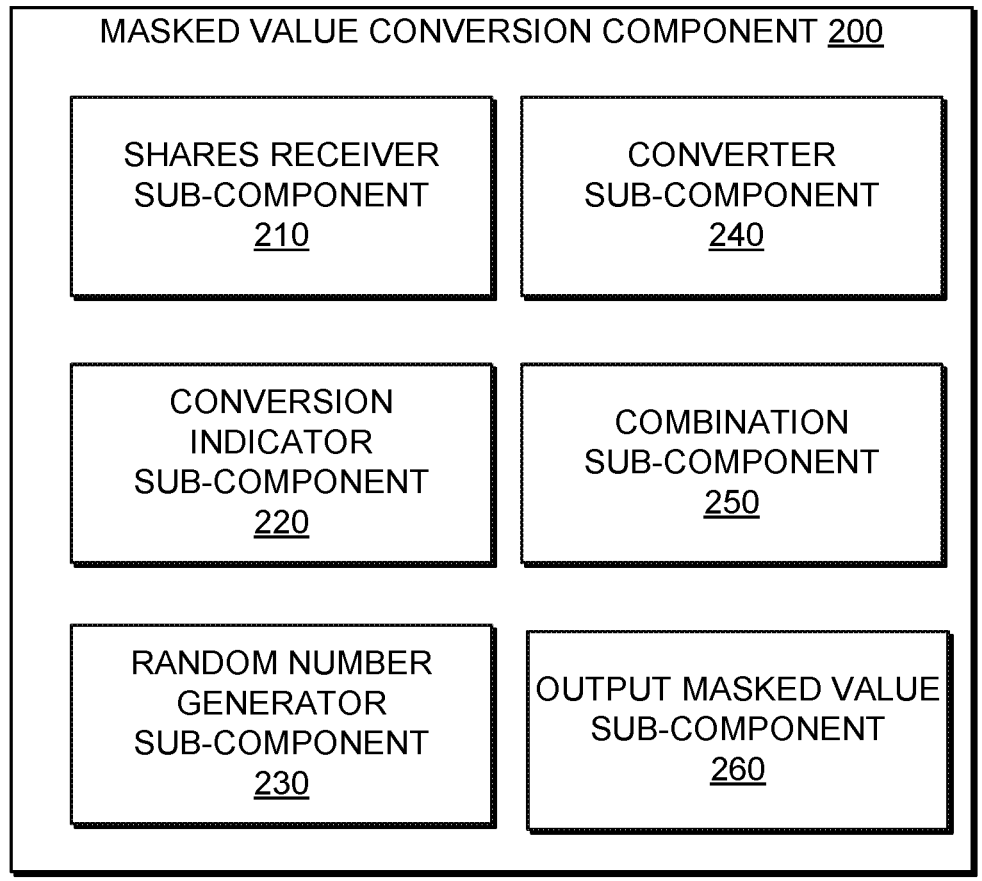
FIG. 2 is a block diagram of a masked value conversion component to provide a conversion from a Boolean masked value to an arithmetically masked value for cryptographic operations in accordance with some embodiments.

FIG. 2 is a block diagram of a masked value conversion component 200 to convert a Boolean masked input value to an arithmetically masked input value. The masked value conversion component 200 may correspond to the masked value conversion component 111 of FIG. 1. Furthermore, the masked value conversion component 200 may be implemented by or in processing logic that may include hardware (e.g., processing device, circuitry, dedicated logic, programmable logic, microcode, integrated circuit, hardware of a device, etc.), software (e.g., instructions run or executed on a processing device), or a combination thereof. In some embodiments, the masked value conversion component 200 may include a shares receiver sub-component 210, a conversion indicator sub-component 220, a random number generator sub-component 230, a converter sub-component 240, a combination sub-component 250, and an output masked value sub-component 260. In alternative embodiments, the functionality of one or more of the sub-components may be combined or divided.

As shown in FIG. 2, the masked value conversion component 200 may include a shares receiver sub-component 210 that may receive shares corresponding to a masked input value. The masked value conversion component 200 may receive three or more shares that correspond to the masked input value. For example, a value 'x' may be masked by combining the value 'x' with a first random number and a second random number. The combination of the value 'x' with the first and second random numbers may be the first share. The first random number may be the second share and the second random number may be the third share. In some embodiments, a combination of the first share, second share, and the third share may result in the value of 'x.'

The masked value conversion component 200 may further include a conversion indicator sub-component 220 that may receive an indication that a cryptographic component that has been performing a cryptographic operation based on a Boolean operation is now performing the cryptographic operation based on an arithmetic operation. In response to receiving the indication, the shares receiver sub-component 210 may receive the first, second, and third shares from another component or a memory of a device that includes the masked value conversion component 200. The random number generator sub-component 230 may generate random numbers for use in the conversion of the Boolean masked input value to an arithmetically masked input value.

Figure 3A:
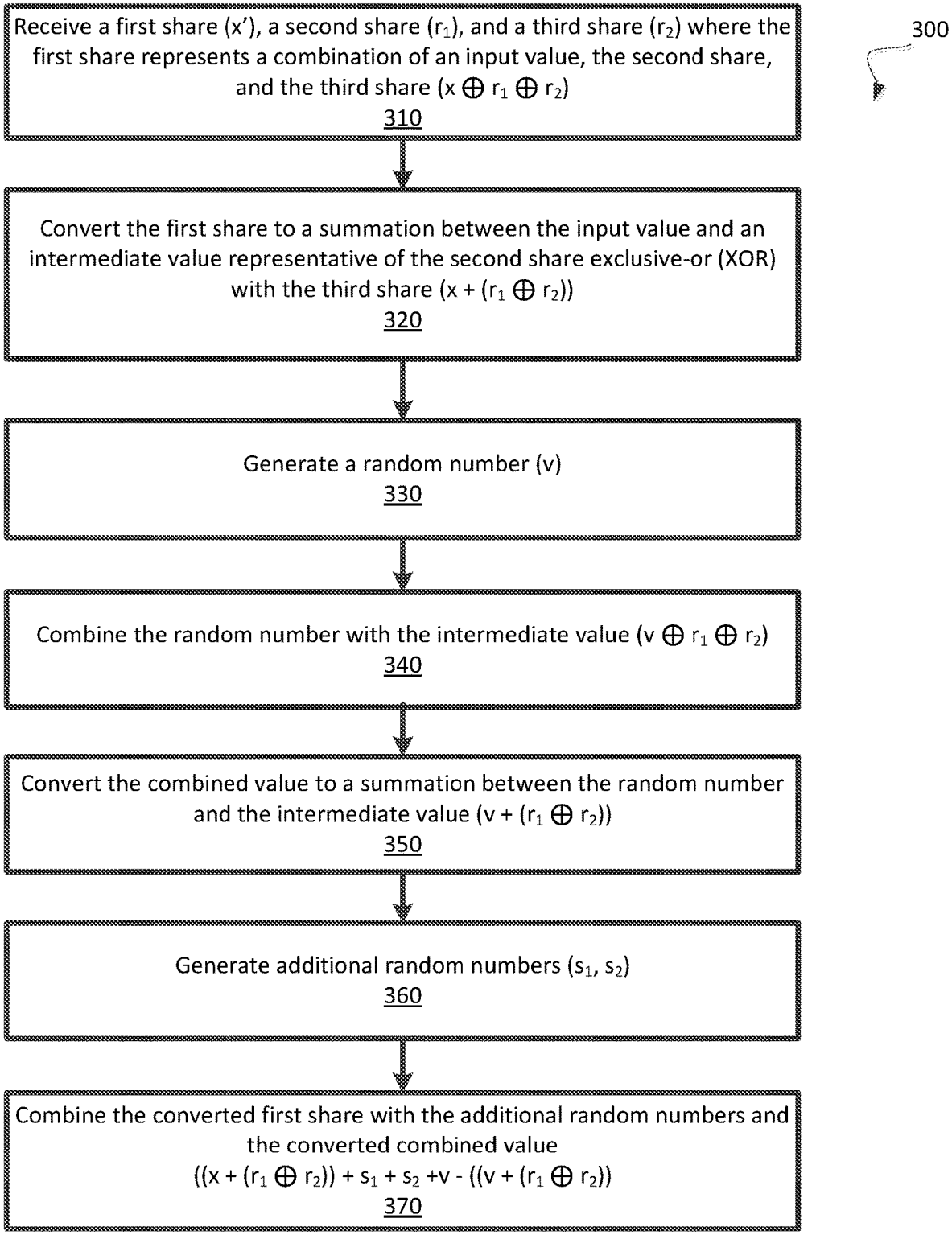
FIG. 3A is a flow diagram of an example method to perform a conversion of a Boolean masked value to an arithmetically masked value for cryptographic operations in accordance with some embodiments of the present disclosure.

Furthermore, the converter sub-component 240 may perform an operation with a value represented by a combination of three values that are subjected to an exclusive-or (XOR) operation as described in further detail with regards to FIG. 3A. For example, the converter sub-component 240 may convert one of the three received shares. The combination sub-component 250 may combine multiple values to generate the arithmetically masked output value. For example, the combination sub-component may perform an addition operation, an XOR operation, and/or a subtraction operation with multiple values. Additionally, the output masked value sub-component 260 may provide the result of the combination sub-component as the converted masked value to a cryptographic component performing a cryptographic operation.

FIG. 3A is a flow diagram of an example method 300 to perform a conversion of a Boolean masked value to an arithmetically masked value for cryptographic operations. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the masked value conversion component 111 of FIG. 1 or the masked value conversion component 200 of FIG. 2.

As shown in FIG. 3A, the method 300 may begin, at block 310, with processing logic receiving a first share ($x'$), a second share ($r_1$), and a third share ($r_2$) where the first share represents a combination of an input value, the second share, and the third share ($x \oplus r_1 \oplus r_2$). Thus, the first share may represent an input value (e.g., x) that is masked by combining the input value with the second share and the third share based on XOR operations. The first share may correspond to a Boolean value as the first share is based on the XOR operations. In some embodiments, the second share and the third share may correspond to random numbers. For example, each of the second share and the third share may correspond to different random numbers. As such, multiple shares (i.e., input shares) corresponding to a Boolean input value may be received.

The processing logic may further convert the first share to a summation between the input value and an intermediate value that is representative of the second share exclusive-or (XOR) with the third share ($x+(r_1 \oplus r_2)$) (block 320). Thus, the received first share ($x \oplus r_1 \oplus r_2$) may be converted to ($x+(r_1 \oplus r_2)$). In some embodiments, an extra random value may be used where the first share is changed to ($x \oplus r_1 \oplus r_2 \oplus \alpha$) and converted to ($x+(r_1 \oplus r_2 \oplus \alpha)$) where a may correspond to a new random number. In some embodiments, another extra random value μ may be used where the first share is first changed to ($x \oplus r_1 \oplus r_2 \oplus \alpha$) and converted to ($x+(r_1\ r_2 \oplus \alpha)$) followed by an XOR operation between the intermediate value and the extra random value (($x+(r_1 \oplus r_2 \oplus \alpha)) \oplus \mu$) and converted to ($x+(r_1 \oplus r_2 \oplus \alpha))+\mu$. The processing logic may further generate a random number (v) (block 330). In some embodiments, the random number may be different than the random number of the second share and the third share. Furthermore, the processing logic may combine the random number with the intermediate value ($v \oplus r_1 \oplus r_2$) (block 340). For example, an XOR operation may be performed between the generated random value and the second share and the third share. In some embodiments, the random number may first be combined with one of the second share or the third share and the result may subsequently be combined with the other of the second share or the third share so that the random number is not stored separately in a memory element or register. For example, the combined value may be stored in a register where random number and the second share are combined to generate an intermediate value and the intermediate value is then combined with the third share to generate the combined value. In an alternative embodiment, the random number may be combined with the intermediate value that corresponds to ($v+(r_1 \oplus r_2 \oplus \alpha)$) as described above. For example, an XOR operation may be performed between the generated random value, the second share, the third share, and the new random number 'α.'

Referring to FIG. 3A, the processing logic may further convert the combined value of the random number and the intermediate value to a summation between the random number and the intermediate value ($v+(r_1 \oplus r_2)$) (block 350). For example, the combined value of the random number with the second share and the third share may be converted to a summation (or subtraction) between the random number and a value that represents the second share combined with the third share by an XOR operation. In the alternative embodiment, the processing logic may convert the combined value of the random number and the intermediate value to a subtraction between the random number and the intermediate value ($v-(r_1 \oplus r_2)$). The processing logic may further generate additional random numbers ($s_1, s_2$) (block 360). In some embodiments, the additional random numbers that are generated may be different than the random numbers corresponding to the second share and the third share. In alternative embodiments, the additional random numbers that are generated may be the same as the random numbers corresponding to the second share and the third share. The additional random numbers may correspond to two new random mask values used with the original input value (e.g., x). The processing logic may further combine the converted first share ($x+(r_1 \oplus r_2)$) with the additional random numbers ($s_1, s_2$) and the converted combined value ($v+(r_1 \oplus r_2)$) (block 370). For example, the converted first share may be added with each of the additional random numbers and the converted combined value may be subtracted from the result. For example, the processing logic may perform a summation operation based on the converted first share and additional random numbers and a subtraction operation with the converted combined value ($x+(r_1 \oplus r_2))+s_1+s_2+v-(v+(r_1 \oplus r_2))$, ($x+(r_1 \oplus r_2 \oplus \alpha))+s_1+s_2+v-(v+(r_1 \oplus r_2 \oplus \alpha))$, or ($x+(r_1 \oplus r_2 \oplus \alpha))+\mu+s_1+s_2+v-(v+(r_1 \oplus r_2 \oplus \alpha))-\mu$. Subsequently, cryptographic operations based on arithmetic operations may be performed. For example, the first share may correspond to a value that is equal to or represents $x+s_1+s_2$ that is a result of the combining of the converted first share with the additional random numbers and the converted combined value, the second share may correspond to the value $s_1$, and the third share may correspond to the value $s_2$. In the alternative embodiment, the processing logic may further combine the converted first share with one of the additional random numbers ($s_1, s_2$) with the converted combined value that is represented by ($v-(r_1 \oplus r_2)$) or ($v-(r_1 \oplus r_2 \oplus \alpha)$).

In some embodiments, the subtraction operation with the converted combined value may be replaced by a value based on the second additional random number that is summed with the results of an XOR operation between the second share and the third share ($s_2+(r_1 \oplus r_2)$). For example, an operation corresponding to the following equations may be performed: ($x+(r_1 \oplus r_2))+s_1+(s_2-(r_1 \oplus r_2))$, ($x+(r_1 \oplus r_2 \oplus \alpha))+s_1+(s_2-(r_1 \oplus r_2 \oplus \alpha))$, or ($x+(r_1 \oplus r_2 \oplus \alpha))+\mu+s_1+(s_2-(r_1 \oplus r_2 \oplus \alpha))-\mu$. Thus, one or more additional random numbers (e.g., v) may not be generated. Each of the operations may result in a value that corresponds to x+s₁+s₂ that may be used as an arithmetic first share.

As such, three or more shares may be received where a first share corresponds to a Boolean based share and the other shares correspond to random numbers. Operations may be performed to convert the Boolean-based share to an arithmetic-based share. The operations may be performed in constant time (e.g., does not depend on the input length of the Boolean masked input value) and in fewer computation steps or operations. For example, the following table illustrates that the present disclosure operates in fewer low-level instructions (Add, Subtract, XOR, etc.) than typical Boolean to arithmetic conversion processes. The following table shows the number of low-level instructions required by the current state-of-the-art compared to that required by this disclosure based on different security orders (e.g., the number of masked shares that are used):

|  | 2$^{nd}$ Order | 3$^{rd}$ Order | 4$^{th}$ Order | 5$^{th}$ Order | 6$^{th}$ Order | 7$^{th}$ Order | 8$^{th}$ Order |
| --- | --- | --- | --- | --- | --- | --- | --- |
| 8 bits | 909 | 1,369 | 1,962 | 2,619 | 3,372 | 4,189 | 5,171 |
| 16 bits | 1,781 | 2,681 | 3,842 | 5,131 | 6,612 | 8,221 | 10,155 |
| 32 bits | 3,525 | 5,305 | 7,602 | 10,155 | 13,092 | 16,285 | 20,123 |
| 64 bits | 7,013 | 10,553 | 15,122 | 20,203 | 26,052 | 32,413 | 40,059 |
| Present Disclosure | 31 | 56 | 115 | 197 | 331 | 513 | 763 |

In some embodiments, the method 300 may be performed by the series of operations as illustrated with respect to FIG. 3B. For example, the series of operations may include 31 computational operations or steps to perform the method 300. In alternative embodiments of the Boolean to arithmetic conversion, the series of operations as illustrated with respect to FIG. 3C may be performed. The series of operations of FIG. 3C may correspond to an implementation based on an XOR sum performed at the end of the conversion process. The Boolean to arithmetic conversion process may also be based on more than three input share values. For example, four or more input share values may be used in the conversion process. The series of operations of FIG. 3D may correspond to an implementation using four input share values (e.g., a third-order Boolean-to-arithmetic mask conversion).

Figure 4:
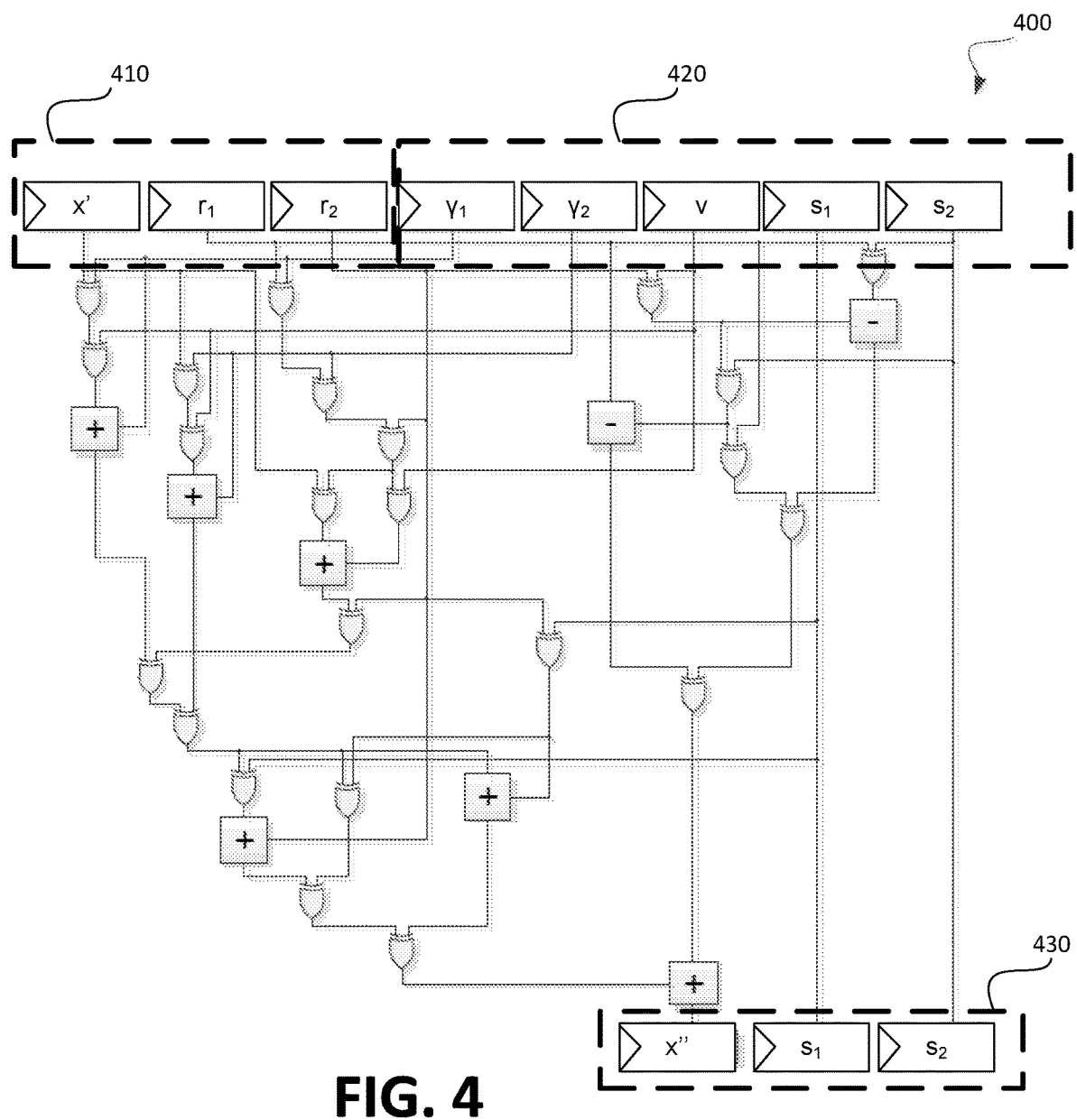
FIG. 4 is an example implementation of a hardware architecture to convert a Boolean masked value to an arithmetically masked value in accordance with some embodiments.

FIG. 4 is an hardware architecture 400 to convert a Boolean masked value to an arithmetically masked value. The architecture 400 may correspond to the masked value conversion component 111 of FIG. 1 or the masked value conversion component 200 of FIG. 2.

As shown in FIG. 4, the architecture 400 may include a first group of memory elements 410 (e.g., registers), a second group of memory elements 420, and a third group of memory elements 430. The first group of memory elements 410 may receive the first share, the second share, and the third share as previously described. For example, a first register of the first group of memory elements 410 may store x' which may represent a Boolean value of (x⊕r₁⊕r₂) where x is the unmasked input value, r₁ is a random number and the second share, and r₂ is another random number and the third share. Furthermore, as shown, the second register of the first group of memory elements 410 stores the second share r₁ and the third register of the first group of memory elements 410 stores the third share r₂. The second group of memory elements 420 may receive and store various random numbers that are generated for use in the converting of the Boolean shares to the arithmetic shares. For example, the registers of the second group of memory elements 420 may store random numbers to convert the first share and additional randomly generated numbers as previously described.

The architecture 400 may include a series of exclusive-or (XOR) gates, adders, and subtractor components as illustrated in FIG. 4. The outputs of the architecture 400 may be stored at the third group of memory elements 430. For example, a combination of the values stored at registers of the first group 410 and the second group 420 may be used to generate the arithmetic share that is converted from the Boolean share. Thus, a first register of the third group of memory elements 430 may store the converted first share (e.g., x'), and a second and third register of the third group of memory elements 430 may store additional mask values (e.g., s₁' and s₂).

Thus, the first group of memory elements 410 may store the shares corresponding to the Boolean masked input, the second group of memory elements 420 may store randomly generated numbers that are used in the conversion process, and the third group of memory elements 430 may store the shares corresponding to the arithmetically masked value.

Figure 5A:
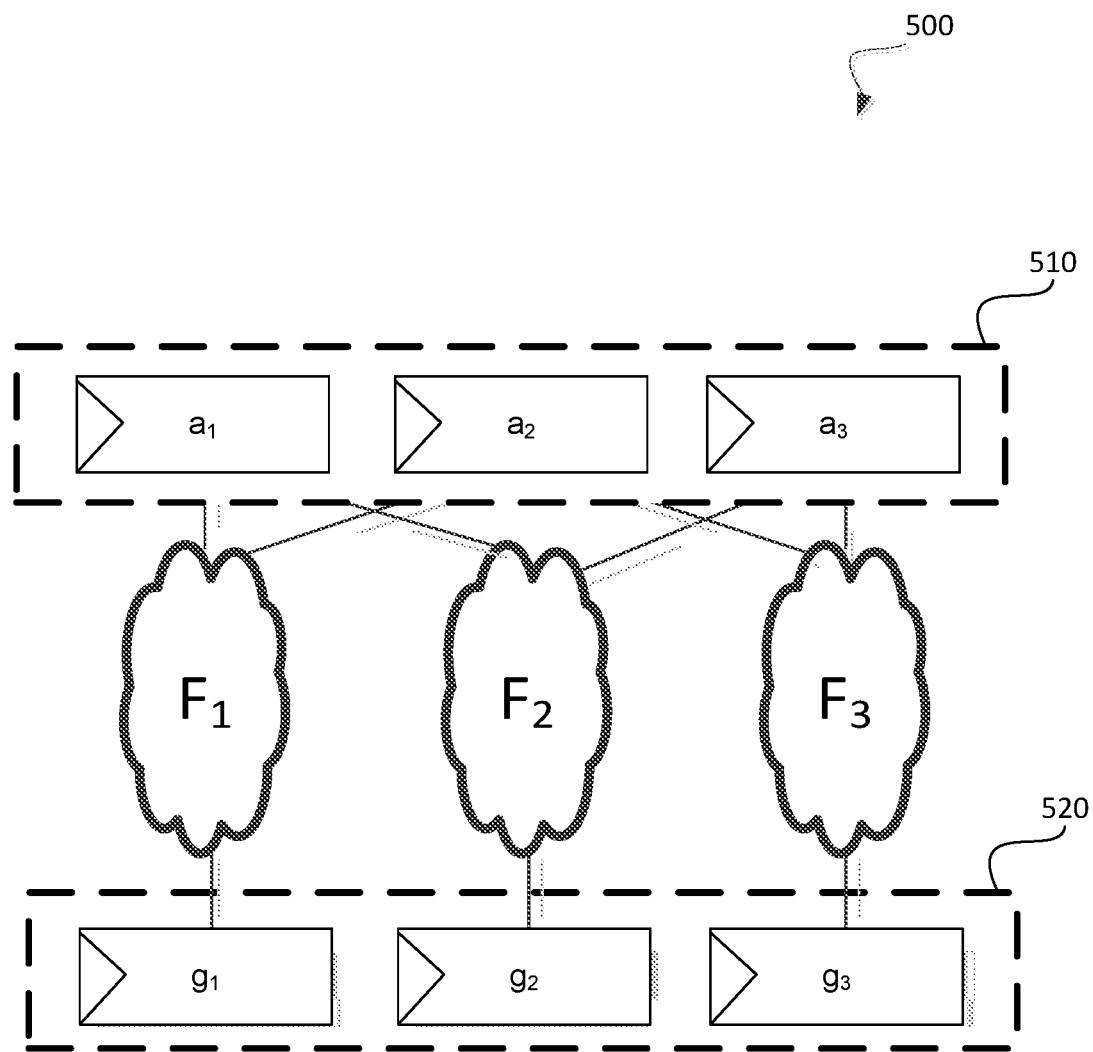
FIG. 5A is an example implementation of another hardware architecture to convert a Boolean masked value to an arithmetically masked value in accordance with some embodiments of the present disclosure.

FIG. 5A is an example implementation of a hardware architecture 500 to convert a Boolean masked value to an arithmetically masked value. The architecture 500 may correspond to the masked value conversion component 111 of FIG. 1 or the masked value conversion component 200 of FIG. 2.

As shown in FIG. 5A, the architecture 500 may include a first group of memory elements 510 and a second group of memory elements 520. The first group of memory elements 510 may store the first share, the second share, and the third share corresponding to a Boolean masked input value as previously described. Various functions corresponding to the functionality of the logic of architecture 400 may split or divide the process of converting the Boolean masked input value to an arithmetically masked input value. For example, each of the functions F₁, F₂, and F₃ may perform a portion of the conversion process or include a portion of the logic of the architecture 400. Furthermore, each of the functions F₁, F₂, and F₃ may receive a subset of the shares. For example, each of the functions may receive two of the three shares corresponding to the Boolean masked input value. Subsequently, the outputs of the functions may be combined and stored at the second group of memory elements 520 to store the first share, second share, and third share for the arithmetically masked input value that has been converted from the Boolean masked input value. In alternative embodiments, the outputs of the functions may not be combined.

Figure 5B:
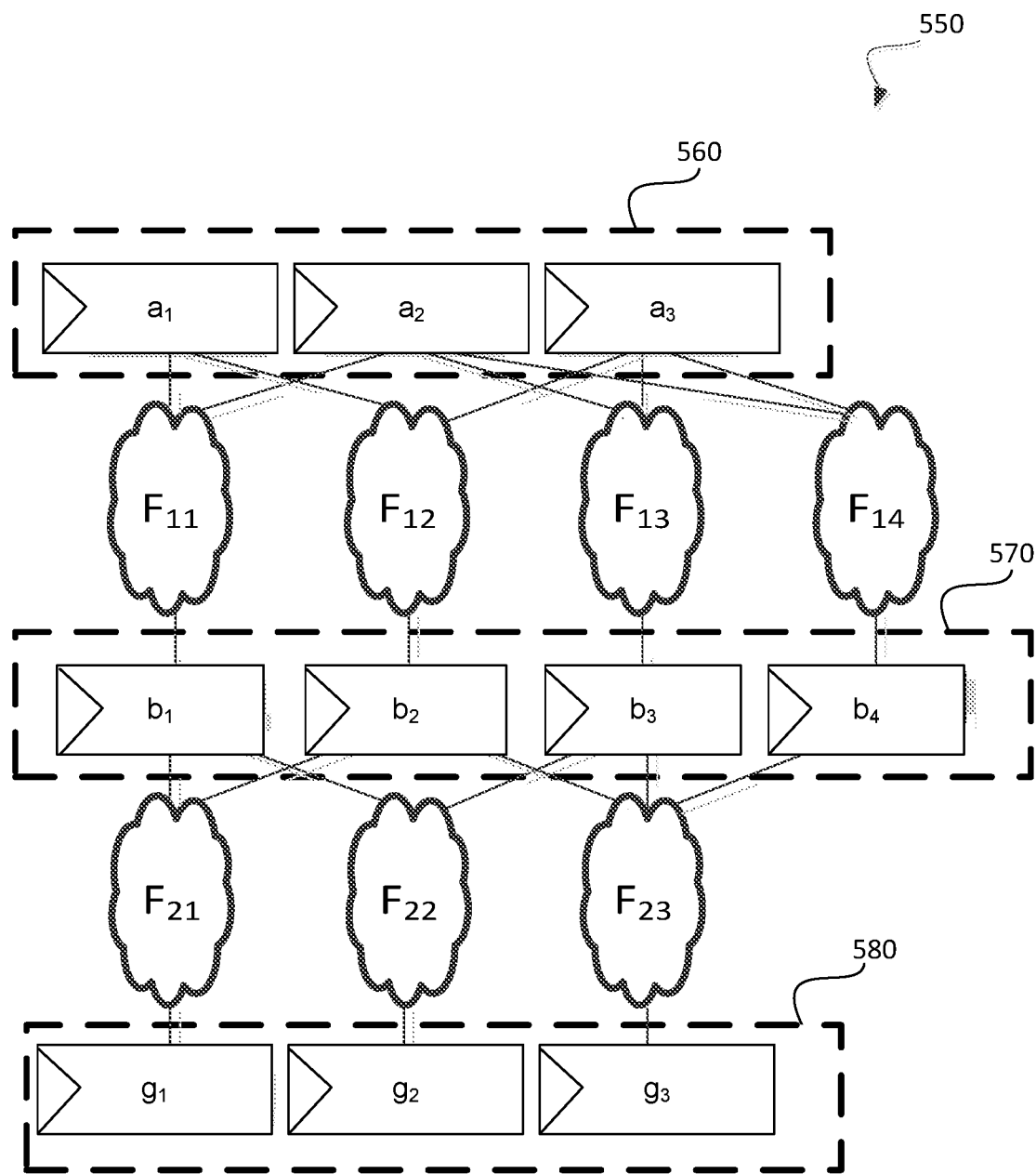
FIG. 5B is an example implementation of another hardware architecture to convert a Boolean masked value to an arithmetically masked value in accordance with some embodiments.

FIG. 5B is another hardware architecture 550 to convert a Boolean masked value to an arithmetically masked value. The architecture 550 may correspond to the masked value conversion component 111 of FIG. 1 or the masked value conversion component 200 of FIG. 2.

As shown in FIG. 5B, the architecture 500 may include a first group of memory elements 560, a second group of memory elements 570, and a third group of memory elements 580. The registers of the first group of memory elements 560 may receive and store the first share, the second share, and the third share corresponding to a Boolean masked input value that is to be converted to the arithmetically masked input value. A first set of functions $F_{11}$, $F_{12}$, $F_{13}$, and $F_{14}$ may perform a first portion of the conversion process and the results of the first portion of the conversion process may be stored at the registers of the second group of memory elements 570. In some embodiments, the number of shares may be increased or expanded by using additional functions as shown in FIG. 5B. For example, the Boolean masked input value of three shares may be increased to four intermediate shares and stored at the second group of memory elements 570. Subsequently, a second set of functions $F_{21}$, $F_{22}$, and $F_{23}$ may perform a second portion of the conversion process and the results of the second portion of the conversion process may be stored at the registers of the third group of the memory elements 580. The second set of functions may receive the four intermediate shares and generate a fewer number of shares that correspond to the arithmetically masked input value. For example, four intermediate shares may be used by the three functions of the second set of functions to generate the three shares corresponding to the arithmetically masked input value. Although FIG. 5B illustrates two sets of functions, the architecture to convert the Boolean masked value to the arithmetically masked value may include any number of sets of functions.

Figure 6:
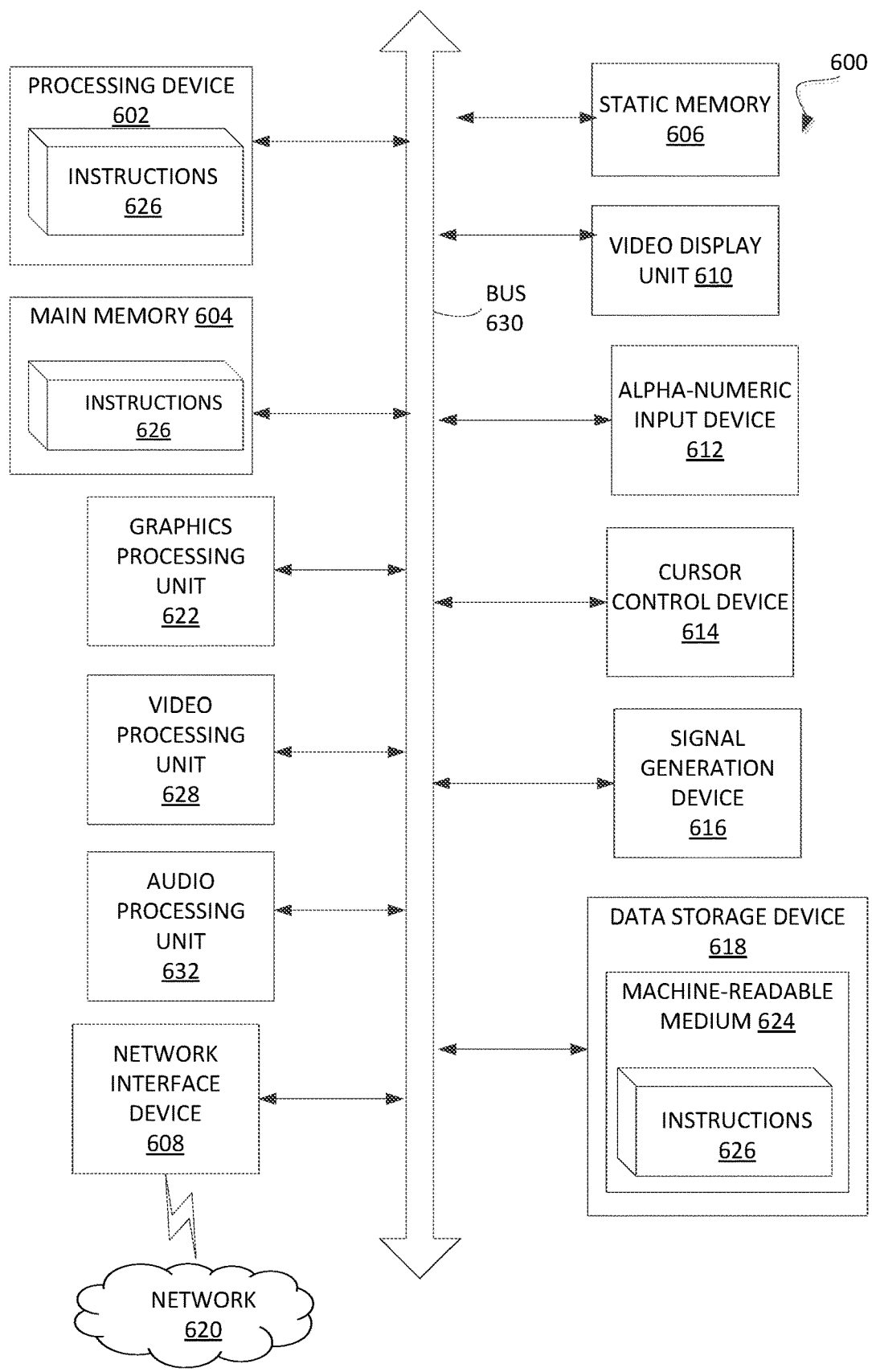
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a masked value conversion component (e.g., masked value conversion component 111 of FIG. 1 or masked value conversion component 200 of FIG. 2). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
 a set of registers to store a first input share value, a second input share value, a third input share value, and a first output share value, wherein the first input share value represents a Boolean combination between an input value, the second input share value, and the third input share value;
 a first circuit to perform a cryptographic operation based on a Boolean operation and an arithmetic operation; and
 a second circuit coupled to the set of registers and the first circuit, wherein the second circuit is to:
  convert the first input share value to a summation or subtraction between the input value and a combination of the second input share value and the third input share value;
  generate a first random value;
  combine the first random value with the second input share value and the third input share value to generate a combined value;
  convert the combined value to a summation or subtraction between the first random value and a combination of the second input share value and the third input share value;
  generate a second random value; and
  generate the first output share value based on a combination of the converted first input share value, the converted combined value, and the second random value.

2. The system of claim 1, wherein the second circuit is further to:
 receive an indication that the cryptographic operation being performed by the first circuit has switched from using the Boolean operation to using the arithmetic operation; and
 in response to the indication, receive the first input share value, the second input share value, the third input share value from the set of registers.

3. The system of claim 1, wherein the set of registers is further to store a second output share value and a third output share value, wherein the first output share value represents an arithmetic combination between the input value, the second output share value, and the third output share value, wherein the second random value corresponds to the second output share value, wherein the second circuit is further to generate a third random value, wherein the third random value corresponds to the third output share value.

4. The system of claim 3, wherein the second output share value and the third output share value are the same as the second input share value and the third input share value.

5. The system of claim 3, wherein the second output share value and the third output share value are each different than the second input share value and the third input share value.

6. The system of claim 1, wherein the second circuit is further to:
 receive at least one additional input share value, wherein the second circuit is to generate the first output share value further based on the at least one additional input share value.

7. The system of claim 1, wherein to combine the first random value with the second input share value and the third input share value to generate the combined value, the second circuit is further to:
 at a first time, perform an XOR operation between the first random value and the second input share value to generate an intermediate value;
 at a second time after the first time, perform the XOR operation between the intermediate value and the third input share value to generate a second intermediate value; and
 convert the second intermediate value to the combined value.

8. The system of claim 1, wherein to generate the first output share value, the second circuit is further to:
 perform a summation or subtraction between the converted first input share value and at least the second random value; and perform a subtraction operation between a result of the summation or subtraction and the combined value.

9. A method comprising:
performing a cryptographic operation with a Boolean operation;
receiving a first input share value, a second input share value, and a third input share value;
converting the first input share value to a summation or subtraction between an input value and a combination of the second input share value and the third input share value;
generating a first random value;
combining the first random value with the second input share value and the third input share value to generate a combined value;
converting the combined value to a summation or subtraction between the first random value and a combination of the second input share value and the third input share value;
generating a second random value;
generating a first output share value based on a combination of the converted first input share value, the converted combined value, and the second random value; and
performing the cryptographic operation with an arithmetic operation by using the first output share value.

10. The method of claim 9, further comprising:
receiving an indication that the cryptographic operation has switched from using the Boolean operation to using the arithmetic operation.

11. The method of claim 9, wherein combining the first random value with the second input share value and the third input share value to generate the combined value comprises:
at a first time, performing an XOR operation between the first random value and the second input share value to generate an intermediate value;
at a second time after the first time, performing the XOR operation between the intermediate value and the third input share value to generate a second intermediate value; and
converting the second intermediate value to the combined value.

12. The method of claim 9, wherein a second output share value and a third output share value associated with the first output share value are the same as the second input share value and the third input share value.

13. The method of claim 9, wherein a second output share value and a third output share value associated with the first output share value are each different than the second input share value and the third input share value.

14. The method of claim 9, further comprising:
receiving at least one additional input share value, wherein generating of the first output share value is further based on the at least one additional input share value.

15. The method of claim 9, wherein combining the first random value with the second input share value and the third input share value to generate the combined value comprises:
at a first time, performing an XOR operation between the first random value and the second input share value to generate an intermediate value;
at a second time after the first time, performing the XOR operation between the intermediate value, the third input share value, and an additional random value to generate a second intermediate value; and
converting the second intermediate value to the combined value.

16. The method of claim 9, wherein generating the first output share value comprises:
performing a summation or subtraction between the converted first input share value and the second random value and a third random value; and
performing a subtraction operation between a result of the summation or subtraction and the combined value.

17. A non-transitory computer readable medium including data that, when accessed by a processing device, cause the processing device to perform operations comprising:
performing a cryptographic operation with a Boolean operation;
receiving a first input share value, a second input share value, and a third input share value;
converting the first input share value to a summation or subtraction between an input value and a combination of the second input share value and the third input share value;
generating a first random value;
combining the first random value with the second input share value and the third input share value to generate a combined value;
converting the combined value to a summation or subtraction between the first random value and a combination of the second input share value and the third input share value;
generating a second random value;
generating a first output share value based on a combination of the converted first input share value, the converted combined value, and the second random value; and
performing the cryptographic operation with an arithmetic operation by using the first output share value.

18. The non-transitory computer readable medium of claim 17, the operations further comprising:
receiving an indication that the cryptographic operation has switched from using the Boolean operation to using the arithmetic operation.

19. The non-transitory computer readable medium of claim 17, wherein to combine the first random value with the second input share value and the third input share value to generate the combined value, the operations further comprise:
at a first time, performing an XOR operation between the first random value and the second input share value to generate an intermediate value;
at a second time after the first time, performing the XOR operation between the intermediate value and the third input share value to generate a second intermediate value; and
converting the second intermediate value to the combined value.

20. The non-transitory computer readable medium of claim 17, wherein a second output share value and a third output share value associated with the first output share value are the same as the second input share value and the third input share value.

* * * * *